United States Patent
Ferguson

(10) Patent No.: US 6,714,950 B1
(45) Date of Patent: Mar. 30, 2004

(54) METHODS FOR REPRODUCING AND RECREATING ORIGINAL DATA

(75) Inventor: Helaman David Pratt Ferguson, Orem, UT (US)

(73) Assignee: Novell, Inc., Provo, UT (US)

( * ) Notice: Subject to any disclaimer, the term of this patent is extended or adjusted under 35 U.S.C. 154(b) by 182 days.

(21) Appl. No.: 09/891,797

(22) Filed: Jun. 26, 2001

Related U.S. Application Data

(63) Continuation of application No. 09/754,748, filed on Jan. 4, 2001, now abandoned.

(51) Int. Cl.[7] .............................................. G06F 17/30
(52) U.S. Cl. .................................... 707/201; 707/104.1
(58) Field of Search ............................... 707/1, 2, 3, 4, 707/5, 6, 8, 101, 102, 104.1, 202, 203; 714/799; 715/511; 709/206

(56) References Cited

U.S. PATENT DOCUMENTS

| | | | | |
|---|---|---|---|---|
| 6,098,069 | A | | 8/2000 | Yamaguchi ................. 707/102 |
| 6,219,818 | B1 | * | 4/2001 | Freivald et al. ............. 714/799 |
| 6,366,933 | B1 | * | 4/2002 | Ball et al. .................... 715/511 |
| 6,393,438 | B1 | * | 5/2002 | Kathrow et al. ............. 707/203 |
| 6,507,865 | B1 | * | 1/2003 | Hanson et al. .............. 709/206 |

* cited by examiner

*Primary Examiner*—Diane D. Mizrahi
*Assistant Examiner*—Yicun Wu
(74) *Attorney, Agent, or Firm*—Dinsmore & Shohl LLP

(57) ABSTRACT

Methods of reproducing and recreating original data are provided. A method of reproducing original data is provided wherein original data are received in a first format and native data are extracted from the original data in a second format. Moreover, derivative data are generated from the native data in a first format with the derivative data compared to the original data producing a difference data. The difference data are used with the native data to create a replica of the original data.

Further, a method of recreating a replica of original data is provided comprising receiving native data in a native format which are extracted from an original data in an original format. Also, derivative data are generated from the native data in an original format. A replica of the original data is reproduced by using the derivative data and difference data, wherein the difference data identify differences between the derivative data and the original data.

Moreover, a method of creating a replica of original data is provided comprising generating derivative data from native data wherein the derivative data are in the same format as original data. Difference data are produced to record the differences between the derivative data and the original data. A replica of the original data are created using the derivative data and the difference data.

20 Claims, 4 Drawing Sheets

METHODS FOR REPRODUCING AND RECREATING ORIGINAL DATA

This application is a continuation and claims priority from pending U.S. application Ser. No. 09/754,748 filed on Jan. 4, 2001 now abandoned, the disclosure of which is incorporated herein by reference.

FIELD OF THE INVENTION

The present invention relates generally to methods for reproducing and recreating original data.

BACKGROUND OF THE INVENTION

Data storage, manipulation, and validation are of paramount concerns to application service providers and any organizations warehousing and validating large amounts of data. The ability to efficiently index, store, retrieve, compress, decompress, validate, and authenticate data permits organizations to reduce expenses associated with data storage while increasing any revenue associated with the data, since data access and validation are improved substantially.

By way of example only, consider an enterprise wide electronic mail system implemented within an organization where internal users are permitted to send and receive electronic mail messages to/from external electronic mail systems (e.g., the enterprise electronic mail system supports Internet access).

Even a relatively small enterprise electronic mail system, may typically experience thousands of mail message transmissions in any given day. Accordingly, if the mail system is not monitored closely by trained personnel, in order to migrate large amounts of data around the enterprise's computing environment efficiently, then a substantial degradation of performance or total outages of the mail system could result.

Typically, an electronic mail message, before being transmitted from an external electronic mail system, will be translated to a standard format suitable for transmission. One such standard electronic message format is Multipurpose Internet Mail Extension (MIME). Various versions of MIME exist, such as by way of example only, Secure MIME or "S/MIME." S/MIME permits the use of cryptographic security services to be used when transmitting messages/data. Some of the services which are supported by S/MIME include authentication, message integrity, non-repudiation of origin (e.g., digital signature), and privacy and data security (e.g., encryption).

When the message is received in the enterprise electronic mail system, the message is typically stored in its original format (e.g., the MIME or S/MIME, the format generated by the external electronic mail system). However, before the enterprise electronic mail system can use the message it must be translated from the original format to a native format which the enterprise electronic mail system supports. In this way, the enterprise electronic mail system will be capable of indexing, displaying, compressing, storing, searching, and retrieving the message in the native format. As a result the message will be stored a minimum of two times in the enterprise electronic mail system.

Further, any validation of the message must occur by retrieving the original format of the message from storage, since the native format of the message alters the data format associated with the message, the native format of the message may not be used to validate the signature or authenticity of the message. Accordingly, a number of additional processing operations must occur before validation may occur, since the internal users of the enterprise electronic mail system will be working with the native format of the message and not the original format or the message.

Moreover, electronic mail systems often use different data encoding schemes, and the compatibility of the various schemes may be rectified with aMIME message header data affixed to the front of message transmissions. These headers may include information such as, by way of example only, the type of encoding used in the message (e.g., character set used to encode the message, quoted printable, base 64, esc sequences, and the like).

Therefore, should an internal user respond or forward a message which was received from an external mail system, the message will be translated into MIME with different header data affixed thereto. This results in potentially a third storage of the message on the enterprise electronic mail system.

Further, MIME compatible data formats do not compress well and correspondingly the attempt to use data compression on MIME data will not save any substantial storage space. Yet, native format data used by enterprise electronic mail systems typically do compress native format data well, and native data are often compressed prior to being stored.

As one skilled in the art will appreciate, the ability to recreate an original data in an original data format, such as a mail message received from an external electronic mail system, would permit a receiving computing environment to save significant storage space and computing processing cycles. Further, any data transmission between disparate computing environments would benefit from the ability to dispose of received data in an original format, as long as the capability to recreate the same data in its original format on demand existed.

Accordingly, methods which efficiently permit the reproduction and the recreation of original data are needed, so that disparate computing environments may efficiently operate on data in a format native to each computing environment while still validating and restoring data to an original format when required. In this way, each computing environment may efficiently store, manipulate, and recreate data which are received and transmitted to disparate external computing devices.

SUMMARY OF THE INVENTION

Accordingly, an object of the invention is to provide methods for reproducing and recreating original data. Data are received in a first or original format and translated to a native data in a second or native format. Next, derivative data are generated from the native data in a first or original format, and by comparing the derivative data to original data, difference data are produced. The native data may be processed or indexed as desired in the native or second format, with the derivative data and the original data discarded. When desired, the original data may be recreated by using the difference data, the derivative data, and the native data.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods for reproducing and recreating original data are provided.

A method for reproducing original data having executable instructions is provided, comprising receiving original data in a first format and extracting therefrom native data in a second format. Further, derivative data are generated from the native data in a first format, and the derivative data are compared to the original data to produce difference data. The difference data combined with the native data may be used to create a replica of the original data.

Further, a method of recreating a replica of original data is provided having executable instructions, comprising receiving native data in a native format which are extracted from original data in an original format. Derivative data are generated from the native data in an original format, and reproduction of a replica of the original data is accomplished by using the derivative data and difference data, wherein the difference data identify differences between the derivative data and the original data.

Moreover, a method of creating a replica of original data is provided having executable instructions, comprising generating derivative data from native data wherein the derivative data are in the same format as original data. Difference data are produced which are operable to record the differences between the derivative data and the original data. A replica is created of the original data using the derivative data and the difference data.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

The present invention provides methods for reproducing and recreating original data. One embodiment of the present invention may be implemented in NOVELL's NetWare operating system environment using NOVELL's GROUPWISE electronic mail system and implemented with the Active Server Pages (ASP), Java, C, and C++ programming languages. Of course other operating systems, electronic mail systems, and programming languages (now known or hereafter developed) may also readily employed. Moreover, as one skilled in the art will readily appreciate no electronic mail system is required at all with the present invention, as the present invention may be used when any disparate computing environments are transmitting data between one another.

Figure 4:
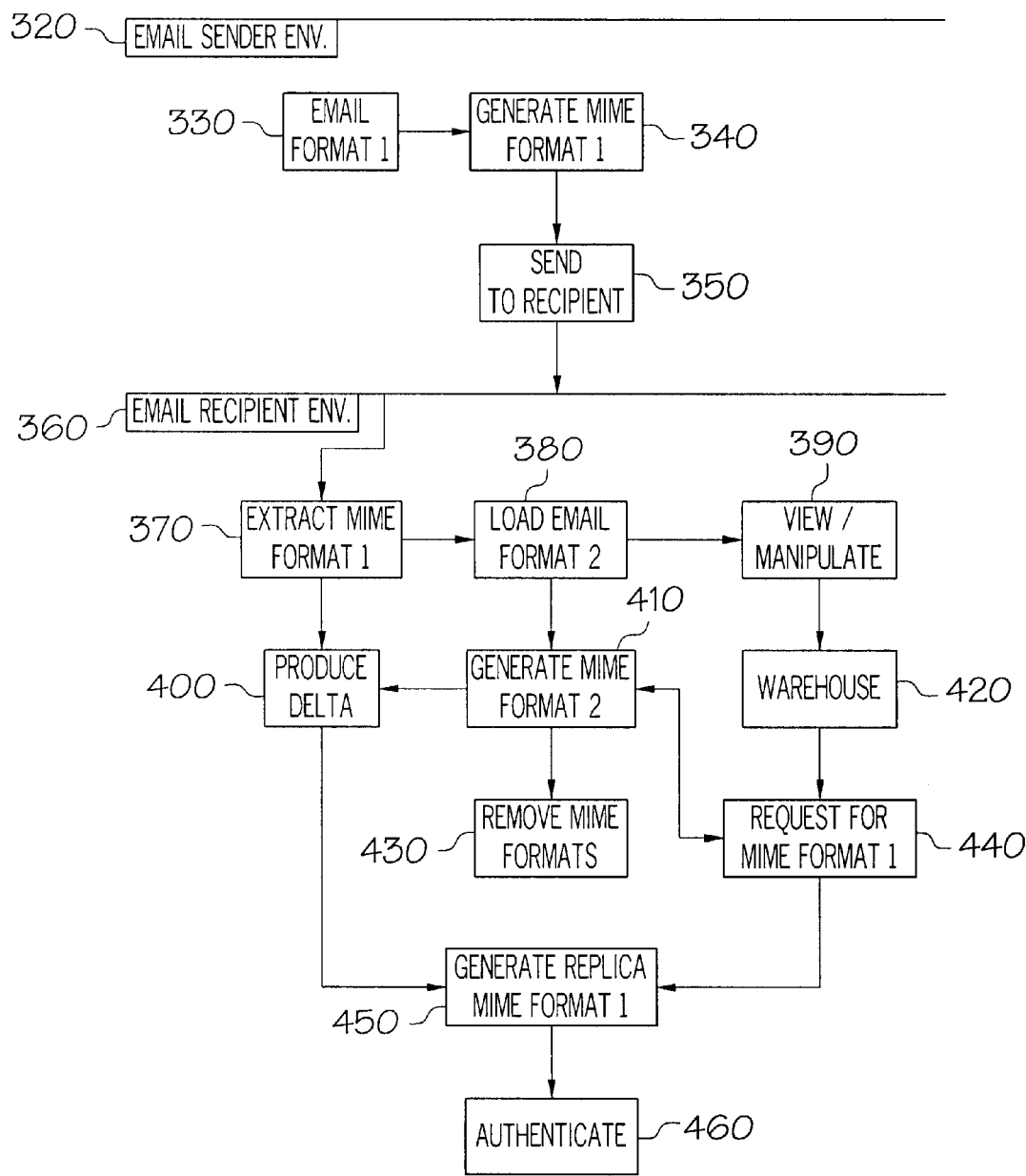
FIG. 4 depicts a schematic diagram for reproducing an electronic mail message to its original format.

Consider, by way of example only, FIG. 4 which depicts a schematic diagram for reproducing an electronic mail message to its original format. Initially, an electronic mail message in a first format 330 is composed in a first email system. Next, prior to sending the message in a first format 330 from a email sending environment 320 to an email recipient environment 360, the email message in the first format 330 is translated to a MIME first format 340 in preparation for being transmitted or sent to the message recipient 350.

Once the email message in the MIME first format 340 is received by the message recipient in the email recipient environment 360, the received message 340 is extracted or translated to produce an email second/native format 380 compatible with the recipient's email system. This second/native format 380 is loaded to the recipient's email. After the received email message is in the second/native format 380, the recipient's email system may provide operations which permit the recipient to view/manipulate the email message 390. Moreover, the email message may be warehoused 420.

Further, once the message is loaded in the second/native format 380, the recipient's email system may generate a second MIME format 410. The second MIME format 410 is compatible with the recipient's email system. In other words, the second MIME format 410 is what the recipient's email system will automatically produce prior to sending an external email message. Next, the second MIME format 410 of the message is compared with the first MIME format 340 to produce delta data 400.

Delta data may include any data which is operable to be applied against the second MIME format 410 to produce the first MIME format 340. This may include, by way of example only, executable instructions which when provided to an interpreter along with the second MIME format 410 will reproduce the first MIME format 340. Many standard operations exist to produce delta data, such as by way of example only, a UNIX "diff" operation.

However, as one skilled in the art will readily appreciate, delta data may also include data files similar to extensible stylesheets which may be used in connection with applications such as extensible stylesheets language transformations (XSLT). In this way, a stylesheet (e.g., delta data) may be used with an XSLT application to render an extensible markup language (XML) defined data file into a first format. Moreover, delta data may include application program interface applications such as a document object model (DOM) file which is operable to define how to produce a first format (e.g., an XML data file) given a second format (e.g. an XML derivative data file).

Once the delta data are produced 400, all MIME files residing on the recipient's electronic mail environment 360 may be deleted or removed 430. This will free a substantial amount of storage space in the recipient's environment 360. Accordingly, with increased storage space less manual intervention and maintenance will be required to efficiently maintain the recipient's email system.

At some later point in time, the recipient may need to reproduce the message in its originally received first MIME format 340, this request 440 may occur because the recipient wishes to validate or authenticate the message 460. To reproduce the first MIME format 340 of the message, the recipient's email system, or a separate application executable from the recipient's email system, will first recreate the second MIME format 410 from the recipient's email system's second/native format 380. Next, the delta data are applied against the second MIME format 410 to produce a replica of the originally received first MIME format 340.

As one skilled in the art will appreciate, by integrating a set of standard executable instructions into an existing email system, received messages may be immediately produced in the email system's MIME format and compared against the original message received to produce delta data. Further, the email system's MIME format, and the original message may be removed from the email system retaining only the delta data.

The email system is then free to index, search, retrieve, warehouse, and compress the message in its own internal native format, thereby increasing system processing performance and reducing system storage requirements. Moreover, when authentication, validation, or reproduction of the original message is required the native format is translated to the email system's MIME format and the retained delta data are applied thereto, producing a replica of the original message.

Although the email message was the data presented in FIG. 4 as an example of the present invention, it will be readily apparent to those skilled in the art that any data transmission between disparate computing environments would benefit by the present invention, such as by way of example only, data transmission between computing devices where the data are viewed in a web browser, and others.

Figure 1:
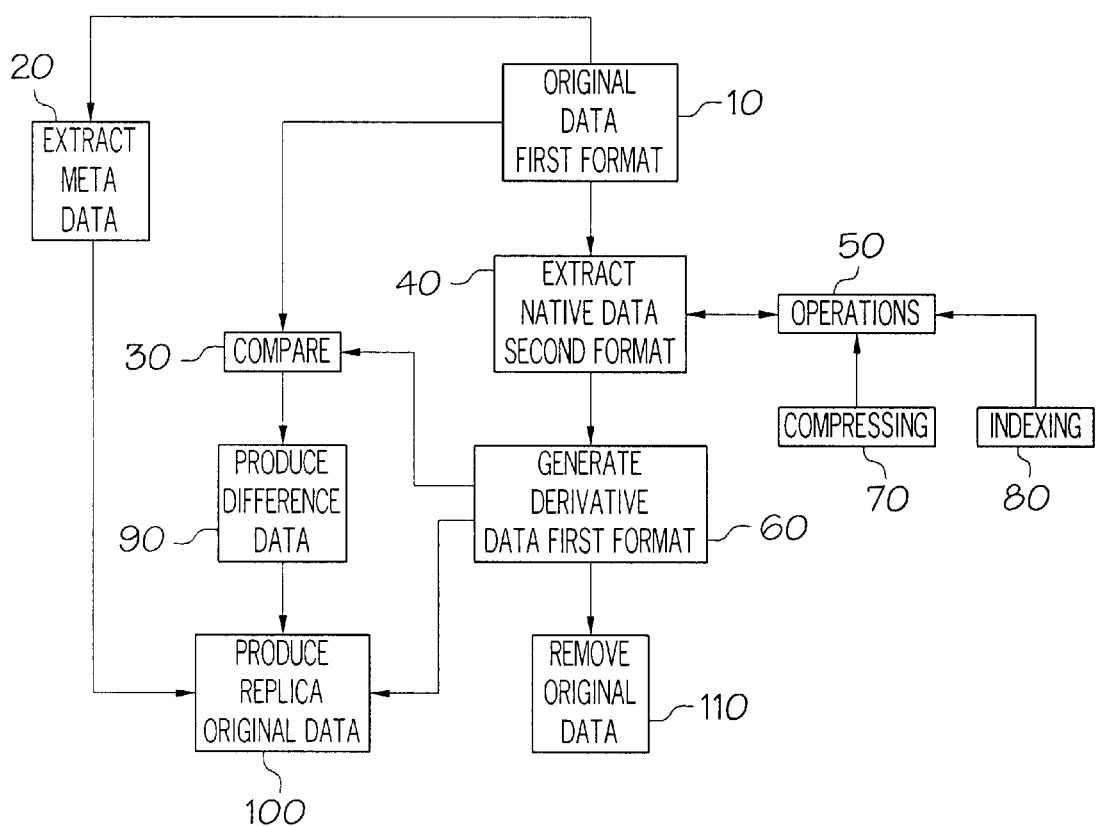
FIG. 1 depicts a flow diagram of a method for reproducing original data.

FIG. 1 depicts a flow diagram of a method for reproducing original data. Original data in a first format are received in step 10, these data are extracted or translated to a native data in a second format in step 40. As is readily apparent to those skilled in the art, many software applications are written to manipulate data in internal or native formats and having the original data translated to a native or second format permits compatibility between disparate applications and increases the performance of the software applications, since these applications do not need to continually translate a first format to a second format on each operation requested.

Once the original data are translated to native data, a variety of operations in step 50 may be performed against the native data. For example, compression in step 70, indexing in step 80, and others.

Further, meta data associated with the original data in a first format may be extracted in step 20. Meta data may include descriptive information about the original data, such as by way of example only, a MIME header data identifying what encoding scheme is being deployed with the original data, and the like.

Moreover, once the native data are extracted, derivative data in a first format may be generated in step 60. As previously presented with the example of email systems in FIG. 4, a variety of additional software applications (e.g., word processors, calendaring systems, web browsers, and others) have the ability to receive and produce data in a format other than a specific application's native or preferred processing format. These types of applications will translate the received format to a native format, and when requested the received format may be produced from the native format. But, as one skilled in the art will readily appreciate the application cannot produce a replica of the originally received format, since a variety of formatting errors will typically occur most of which cannot be completely rectified by software.

As a result, the native data in a second format are translated to derivative data in a first format in step 60 and then compared in step 30 to the original data received in a first format in step 10. This comparison will produce difference data in step 90, and as presented above with delta data, the difference data may be applied against the derivative data to produce a replica of the original data in step 100. Moreover, in producing the replica, the extracted meta data may optionally be used.

At any point after producing the difference data, the original data and the derivative data may be entirely removed. As one skilled in the art will readily appreciate, just prior to producing the replica, the derivative data may be re-created and used in connection with the difference data to produce the replica. In this way, a replica of the original data may be produced on demand even though it has been physically deleted or removed. Further, the replica may be used to perform cryptographic security services such as, by way of example only, data authentication and validation.

Figure 2:
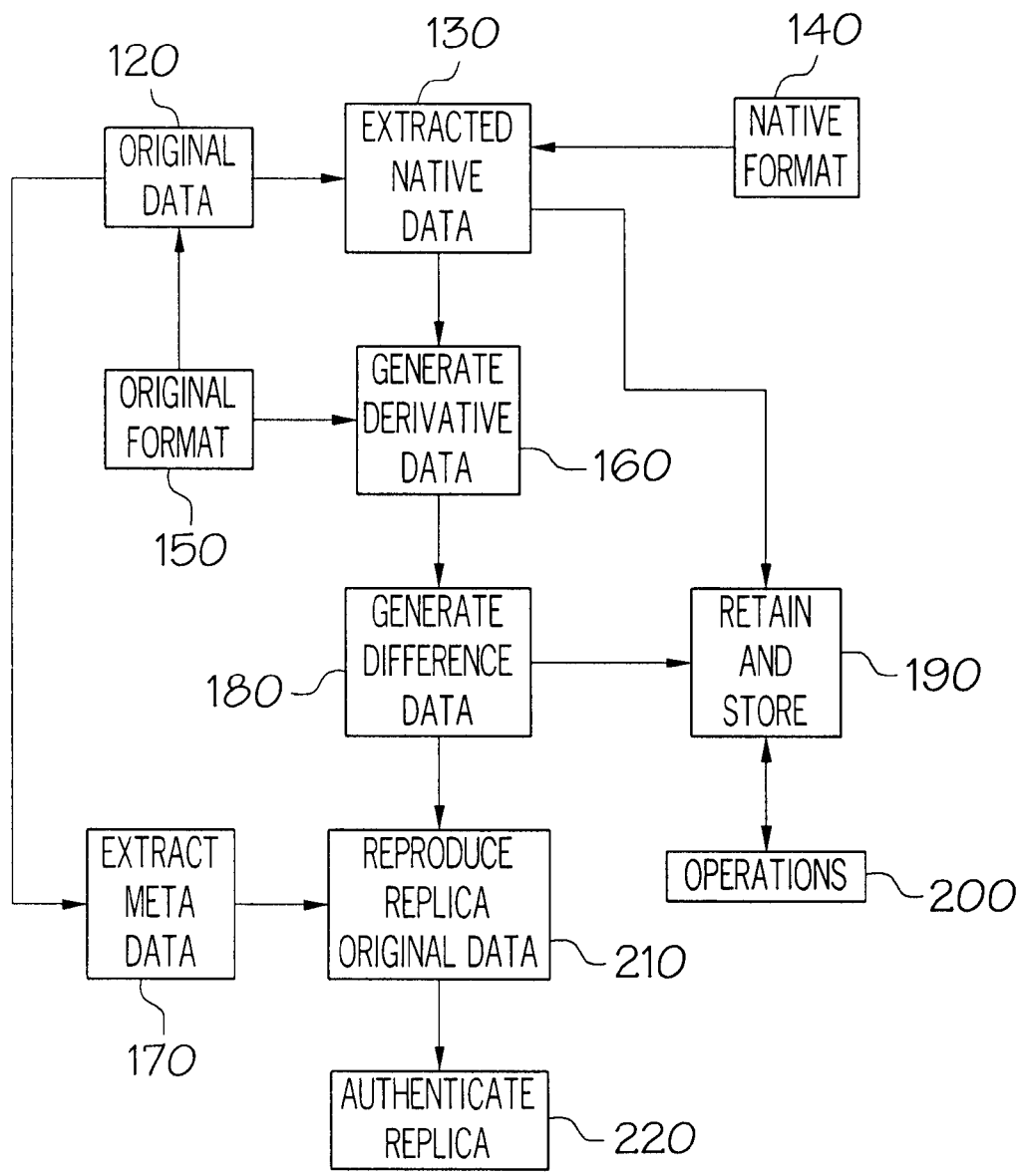
FIG. 2 depicts a flow diagram of a method for recreating a replica of original data.

FIG. 2 depicts a flow diagram of a method for recreating a replica of original data. Native data are received in step 130, wherein the native data are extracted from an original data in step 120 and produced in a native format in step 140. Moreover, the original data are associated with an original format in step 150. The native data are stored or retained (e.g., a cache of a computing device) in step 190, where a variety of operations may be performed in step 200, such as by way of example only data compression or data index generation.

Further, derivative data in a first format are generated from the native data in step 160. As one skilled in the art will readily appreciate, the generation of the derivative data may occur at any point in time after the native data are received. Further, receipt of all of the native data is not required, since the native data may be streamed, as is the case with video data, and other types of transmitted data.

Once derivative data are generated, difference data are generated in step 180 and stored or retained (e.g., a cache of a computing device) in step 190. Difference data are generated by comparing the derivative data to the original data and producing data which are operable to be applied against the derivative data to produce a replica of the original data in step 210.

Moreover, meta data may be extracted in step 170 from the originally received data and used when producing the replica in step 210, as previously presented with the discussion of FIG. 1. After the replica is reproduced, the replica may be authenticated or validated as if it were an identical copy of the original data.

Figure 3:
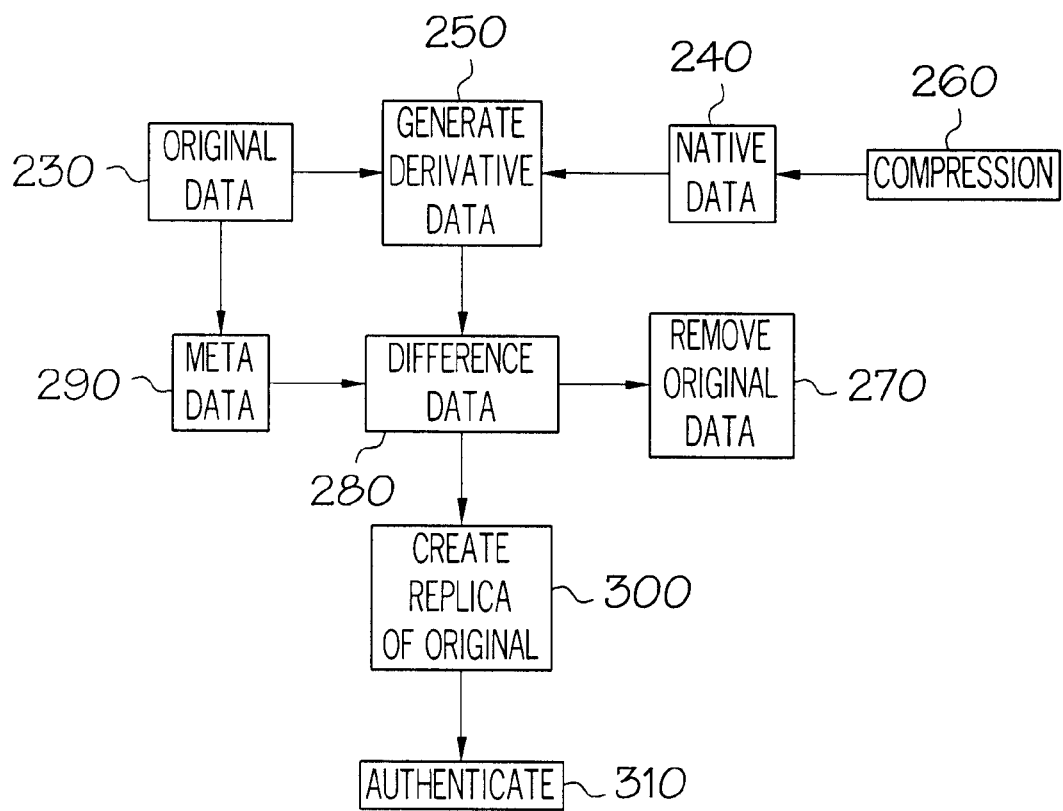
FIG. 3 depicts a flow diagram of a method for creating a replica of original data.

FIG. 3 depicts a flow diagram of a method for creating a replica of original data In step 250 derivative data are produced from native data in step 240. The derivative data are in the same format as original data, and the format of the original data and the native data are different. The native data may be manipulated for purposes of optimal performance or storage (e.g., compression step 260). Further, the derivative data are compared to the original data in step 230 to produce difference data in step 280. Original data may be removed or deleted in step 270 after the difference data are produced in step 280.

A replica of the original data is created in step 300 by using the difference data, and the derivative data and the replica may be authenticated or validated as if it were an identical copy of the original data in step 310. Further, in creating the replica, meta data extracted from the original data in step 290 may be used.

The foregoing description of an exemplary embodiment of the invention has been presented for purposes of illustration and description. It is not intended to be exhaustive nor to limit the invention to the precise form disclosed.

Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A method of reproducing original data utilizing executable instructions, the method comprising:

receiving original data in a first format, the first format being a format for use in a first computing environment;

extracting from the original data native data in a second translated format, the second format being a format for use in a second computing environment;

generating derivative data from the native data, wherein the derivative data is in the first format;

using a difference operation to compare the derivative data to the original data to produce difference data; and using the difference data and the native data to create a replica of the original data, wherein the replica is in the first format.

2. The method of claim 1, further comprising the steps of:

deleting the original data after producing the difference data.

3. The method of claim 1, further comprising the steps of:

storing the native data and the difference data; and deleting the original data and the derivative data.

4. The method of claim 3, further comprising the steps of:

performing one or more operations on the native data.

5. The method of claim 4, wherein one of the operations is at least one of a compression operation and an index generation operation.

6. The method of claim 1, wherein the first format is MIME.

7. The method of claim 1, further comprising the steps of extracting meta data from the original data; and using the meta data to optimize creation of the replica.

8. Method of recreating a replica of original data utilizing executable instructions, the method comprising:

receiving native data in a native format translated from original data in an original format;

generating derivative data from the native data, wherein the derivative data is in the original format;

reproducing a replica of the original data by using the derivative data and difference data, wherein the difference data are created using a difference operation and are operable to identify differences between the derivative data and the original data, such that the original data can be restored without the need for storing the original data.

9. The method of claim 8 further comprising the steps of:

authenticating the replica by validating a digital signature of the original data against a replica digital signature.

10. The method of claim 8, further comprising the steps of:

receiving meta data extracted from the original data; and using the meta data with the derivative data and the difference data in reproducing the replica.

11. The method of claim 8, further comprising the steps of:

retaining the native data and the difference data.

12. The method of claim 8, further comprising the steps of:

performing at least one of a compression operation and an index generation operation on the native data.

13. The method of claim 8, wherein the original format is an encrypted format.

14. The method of claim 8, wherein the difference data are created using a UNIX diff operation.

15. The method of claim 8, wherein the native data are in a format operable to be viewed in an email set of executable instructions.

16. A method of creating a replica of original data utilizing executable instructions, the method comprising:

generating derivative data from native data, wherein the derivative data are in the same format as original data, and wherein the native data and the original data represent the same information in differing formats for use in disparate computing environments;

using a difference operation to produce difference data operable to record the differences between the derivative data and the original data; and creating a replica of the original data using the derivative data and the difference data.

17. The method of claim 16, further comprising the steps of:

removing all references to the original data after producing the difference data.

18. The method of claim 16, further comprising the steps of:

compressing the native data.

19. The method of claim 16, further comprising the steps of:

authenticating the replica as an identical copy of the original data.

20. The method of claim 16, further comprising the steps of:

extracting the native data from the original data in a native format different from the original data and derivative data format.

* * * * *